United States Patent
Du et al.

(10) Patent No.: US 10,833,890 B2
(45) Date of Patent: *Nov. 10, 2020

(54) CARRIER SENSE MULTIPLE ACCESS (CSMA) PROTOCOLS FOR POWER LINE COMMUNICATIONS (PLC)

(71) Applicant: Texas Instruments Incorporated, Dallas, TX (US)

(72) Inventors: Shu Du, San Jose, CA (US); Robert W. Liang, Frisco, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,626

(22) Filed: Oct. 8, 2018

(65) Prior Publication Data

US 2019/0044751 A1   Feb. 7, 2019

Related U.S. Application Data

(63) Continuation of application No. 14/744,295, filed on Jun. 19, 2015, now Pat. No. 10,097,371, which is a continuation of application No. 14/264,676, filed on Apr. 29, 2014, now Pat. No. 9,094,234, which is a
(Continued)

(51) Int. Cl.
*H04L 12/413* (2006.01)
*H04B 3/54* (2006.01)
*H04L 5/00* (2006.01)

(52) U.S. Cl.
CPC .......... *H04L 12/413* (2013.01); *H04B 3/544* (2013.01); *H04L 5/0096* (2013.01)

(58) Field of Classification Search
CPC .................................................... H04L 12/413
See application file for complete search history.

(56) References Cited

U.S. PATENT DOCUMENTS

| | | |
|---|---|---|
| 7,313,113 B1 | 12/2007 | Hills et al. |
| 7,352,770 B1 | 4/2008 | Yonge, III et al. |
| 7,545,781 B2 | 6/2009 | Otsuki et al. |

(Continued)

*Primary Examiner* — John D Blanton
(74) *Attorney, Agent, or Firm* — Brian D. Graham; Charles A. Brill; Frank D. Cimino

(57) ABSTRACT

Systems and methods for carrier sense multiple access (CSMA) protocols for power line communications (PLC) are described. In some embodiments, a method may include performing a virtual carrier sensing operation and, in response to the virtual carrier sensing operation indicating that a communication channel is idle, calculating a contention window. The method may also include performing a physical carrier sensing operation subsequent to the virtual carrier sensing operation, the physical carrier sensing operation based, at least in part, upon the contention window. In response to the physical carrier sensing operation indicating that the communication channel is idle, the method may then include transmitting data over the channel. In other embodiments, another method may include determining that a data transmission is a unicast transmission and that an acknowledgement message has not been received. The method may further include incrementing a backoff parameter and repeating one or more carrier sense operations.

20 Claims, 4 Drawing Sheets

Related U.S. Application Data continuation of application No. 13/300,812, filed on Nov. 21, 2011, now Pat. No. 8,711,873.

(60) Provisional application No. 61/424,159, filed on Dec. 17, 2010.

(56) References Cited

U.S. PATENT DOCUMENTS

| | | |
|---|---|---|
| 7,570,656 B2 | 8/2009 | Raphaeli et al. |
| 8,711,873 B2 | 4/2014 | Du et al. |
| 9,094,234 B2 | 7/2015 | Du et al. |
| 2003/0103521 A1* | 6/2003 | Raphaeli ................ H04B 3/542 370/445 |
| 2005/0025176 A1* | 2/2005 | Ko ...................... H04W 74/085 370/448 |
| 2005/0141547 A1* | 6/2005 | Cho .................. H04W 74/0875 370/448 |
| 2006/0084444 A1* | 4/2006 | Kossi .................... H04W 84/18 455/450 |
| 2007/0230497 A1 | 10/2007 | Choi et al. |
| 2009/0129353 A1 | 5/2009 | Ki et al. |
| 2009/0252053 A1* | 10/2009 | Leith .................... H04W 24/10 370/252 |
| 2010/0202471 A1 | 8/2010 | Maki |
| 2011/0085442 A1* | 4/2011 | Lin ........................ H04L 45/42 370/235 |
| 2011/0149723 A1* | 6/2011 | Gong ................... H04L 1/0002 370/216 |
| 2012/0008626 A1* | 1/2012 | Brederveld .......... G06Q 10/087 370/392 |

\* cited by examiner

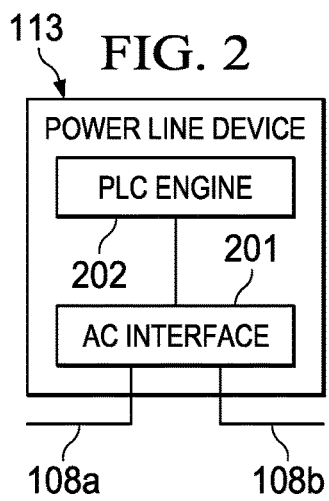
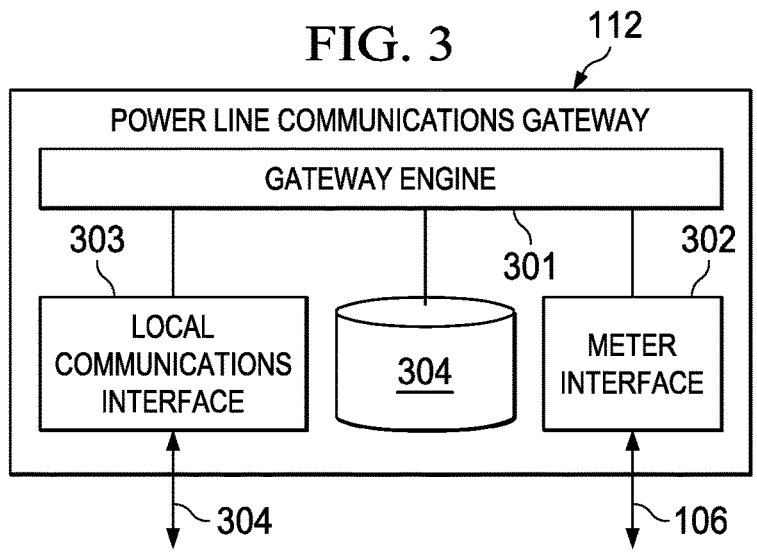
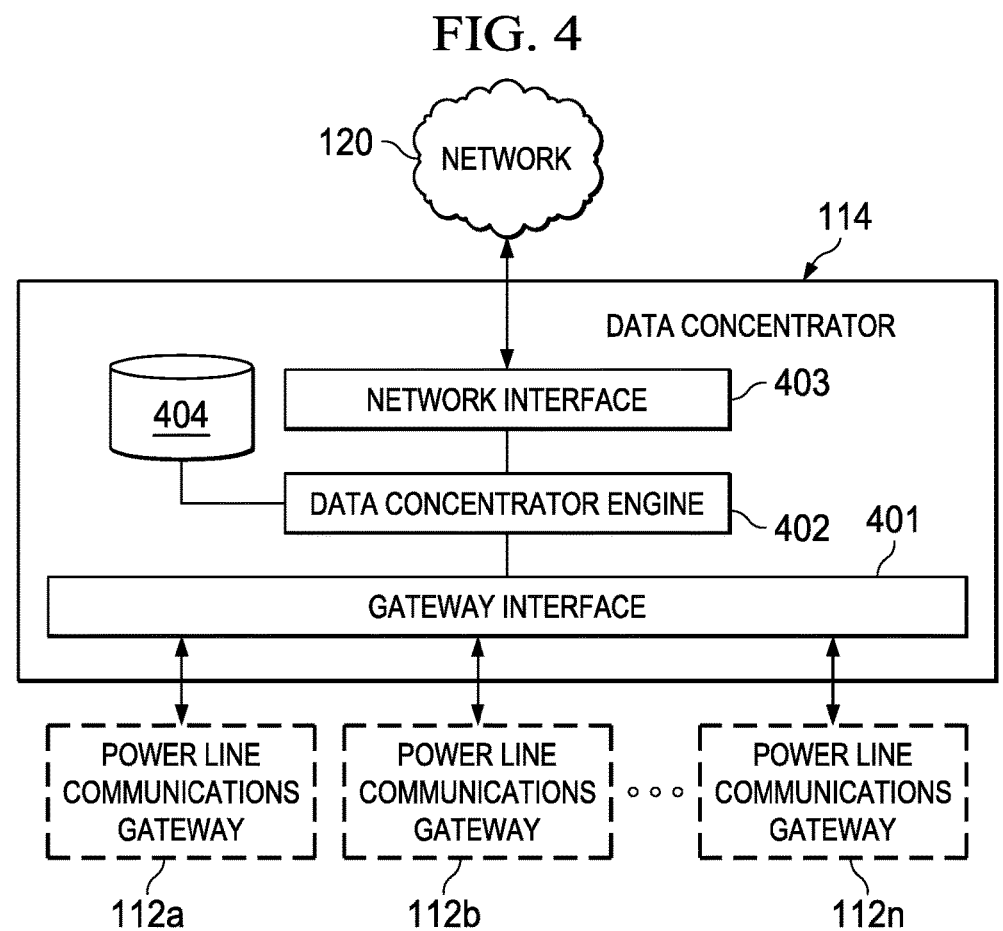

CARRIER SENSE MULTIPLE ACCESS (CSMA) PROTOCOLS FOR POWER LINE COMMUNICATIONS (PLC)

CROSS-REFERENCE TO RELATED APPLICATION(S)

This application is a continuation of U.S. patent application Ser. No. 14/744,295, filed Jun. 19, 2015, which is a continuation of U.S. patent application Ser. No. 14/264,676, filed Apr. 29, 2014, now U.S. Pat. No. 9,094,234, granted Jul. 28, 2015, which is a continuation of U.S. patent application Ser. No. 13/300,812, filed Nov. 21, 2011, now U.S. Pat. No. 8,711,873, granted Apr. 29, 2014, which also claims the benefit of the filing date of U.S. Provisional Patent Application No. 61/424,159, which is entitled "CSMA Method for Advanced Metering Infrastructure Networks" and was filed on Dec. 17, 2010, the disclosure of each application is hereby incorporated by reference herein in its entirety.

TECHNICAL FIELD

Embodiments are directed, in general, to power line communications (PLC), and, more specifically, to carrier sense multiple access (CSMA) protocols for PLC.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Examples of competing PLC standards include the IEEE 1901, HomePlug AV, Powerline Intelligent Metering Evolution (PRIME), and the ITU-T G.hn (e.g., G.9960 and G.9961) specifications.

SUMMARY

Systems and methods for implementing carrier sense multiple access (CSMA) protocols in power line communications (PLC) are described. In an illustrative embodiment, a method may include performing a virtual carrier sensing operation and, in response to the virtual carrier sensing operation indicating that a communication channel is idle, calculating a contention window. The method may also include performing a physical carrier sensing operation subsequent to the virtual carrier sensing operation, the physical carrier sensing operation based, at least in part, upon the contention window. Then, in response to the physical carrier sensing operation indicating that the communication channel is idle, the method may include transmitting data over the channel.

In some cases, for example, calculating the contention window may include setting a length of the contention window, and the physical carrier sensing operation may be carried out at a randomly selected time within the contention window. Also, the method may include repeating the virtual carrier sensing operation until it indicates that the communication channel is idle.

Additionally or alternatively, the method may include, in response to the physical carrier sensing operation indicating that the communication channel is not idle, repeating the virtual carrier sensing operation until it indicates that the communication channel is idle and increasing the length of the contention window to create a modified contention window. For instance, increasing the length of the contention window may include increasing the length of the contention window by an amount corresponding to a number of previous attempts to transmit the data. The method may also include performing a second physical carrier sensing operation subsequent to the repeated virtual carrier sensing operation, the second physical carrier sensing operation based, at least in part, upon the modified contention window. For example, the second physical carrier sensing operation may be carried out at a randomly selected time within the modified contention window. The method may further include, in response to the second physical carrier sensing operation indicating that the communication channel is idle, transmitting data over the communication channel.

In another illustrative embodiment, a method may include: (a) in response to a virtual carrier sense operation indicating that an access channel is free, performing a physical carrier sensing operation based, at least in part, upon an original time window; (b) in response to the physical carrier sensing operation indicating that the access channel is free, initiating a data transmission over the access channel; (c) in response to the data transmission being a unicast transmission and an acknowledgment message not being received by the PLC device, incrementing a backoff counter and increasing the original time window; and (d) in response to the backoff counter having a value smaller than a maximum number of allowed backoff operations, repeating at least (a) and (b) using the increased time window.

In some implementations, increasing the original time window may include increasing a length of the original time window. Also, the physical carrier sensing operation may be performed at a randomly selected time within the original time window, and the repeated physical carrier sensing operation may be performed at a randomly selected time within the incremented time window.

Furthermore, the method may include monitoring an output of the virtual carrier sensing operation until it indicates that the access channel is free. Additionally or alternatively, the method may include, in response to the physical carrier sensing operation indicating that the access channel is busy, increasing the backoff counter, maintaining the original time window, and performing a second physical carrier sensing operation subsequent to a second virtual carrier sensing operation, the second physical carrier sensing operation based, at least in part, upon the original time window. For example, the second physical carrier sensing operation may be carried out at a randomly selected time within the original time window. The method may also include in response to the second physical carrier sensing operation indicating that the access channel is free, transmitting data over the access channel.

In yet another illustrative embodiment, the method may include transmitting data at a time selected within a contention window in response to a determination by a carrier sense operation that a channel is available. The method may also include determining that the data transmission is a unicast transmission, determining that an acknowledgement message has not been received, and increasing the contention window. The method may further include re-transmitting the data at a time selected within the increased contention window.

The method may also include re-transmitting the data in response to another determination by a repeated carrier sense operation that the channel is available. In various implementations, the carrier sense operation may be a virtual carrier sense operation, a physical carrier sense operation, or a combination of physical and virtual carrier sense operations.

In some embodiments, one or more of the methods described herein may be performed by one or more PLC devices (e.g., a PLC modem, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Figure 1:
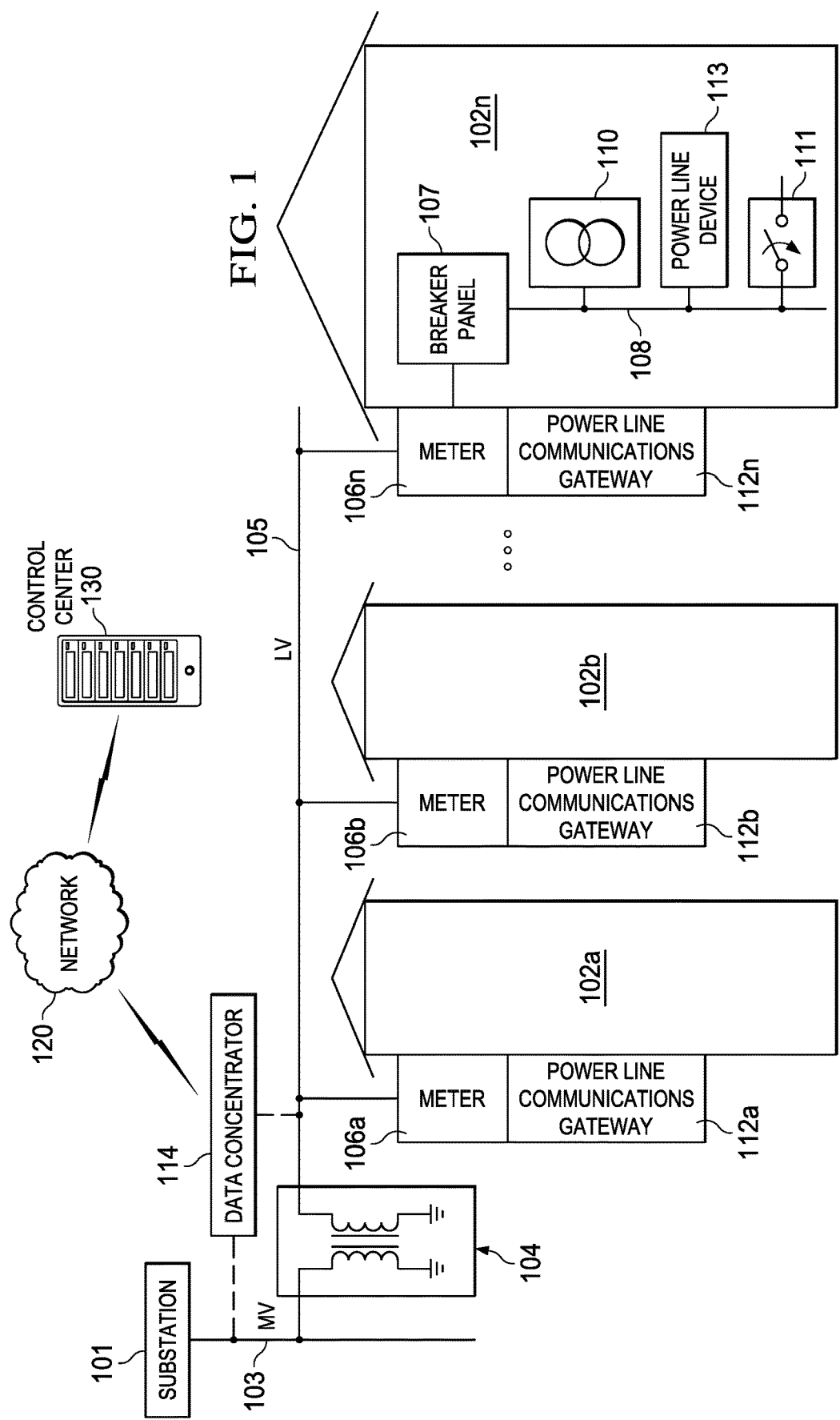

Having thus described the invention(s) in general terms, reference will now be made to the accompanying drawings, wherein:

FIG. 1 is a diagram of a PLC system according to some embodiments.

FIG. 2 is a block diagram of a PLC device or modem according to some embodiments.

FIG. 3 is a block diagram of a PLC gateway according to some embodiments.

FIG. 4 is a block diagram of a PLC data concentrator according to some embodiments.

Figure 5:
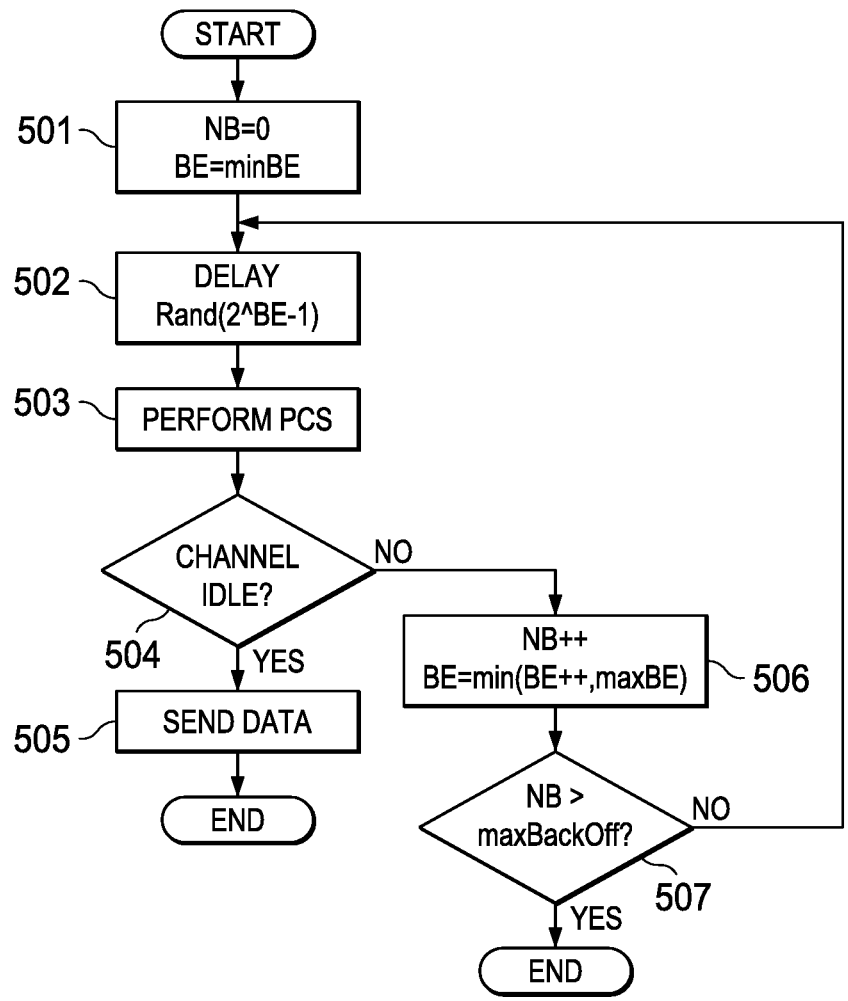

FIG. 5 is a flowchart of a prior art CSMA technique.

Figure 6:
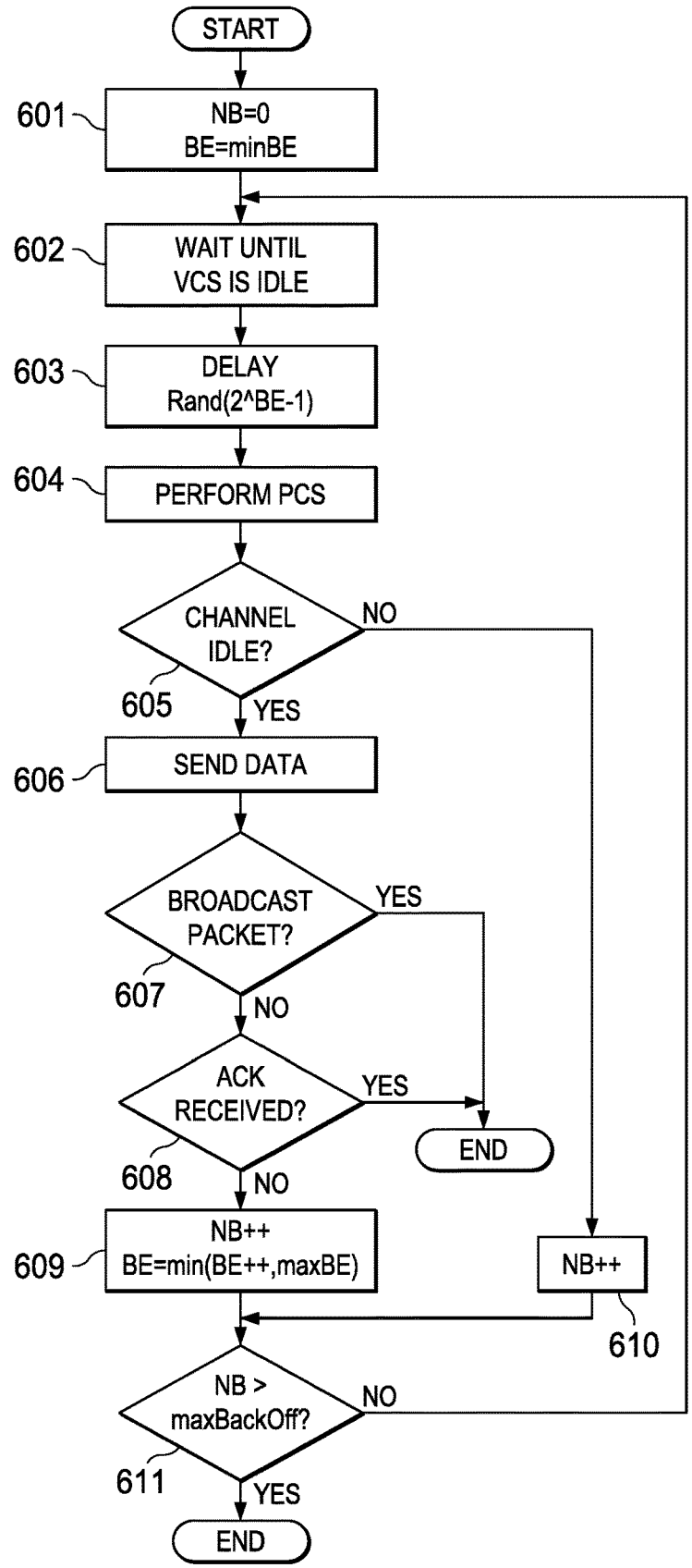

FIG. 6 is a flowchart of a CSMA technique according to some embodiments.

Figure 7:
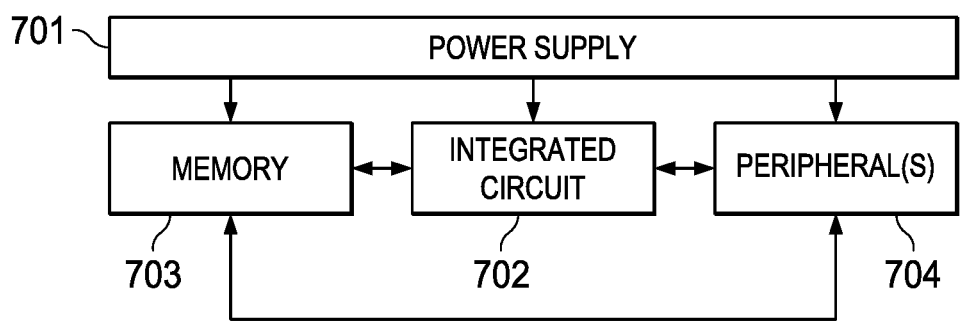

FIG. 7 is a block diagram of an integrated circuit according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Turning to FIG. 1, a power line communication (PLC) system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

FIG. 4 is a block diagram of a PLC data concentrator according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

Generally speaking, prior to transmitting a signal across power lines or wires 103, 105, and/or 108, a PLC device may attempt to detect whether a given communication or access channel (e.g., frequency band) is currently in use. Channel access may be accomplished, for example, by using the Carrier Sense Multiple Access with Collision Avoidance (CSMA/CA) mechanism with a random backoff time. The random backoff mechanism may spread the time over which PLC devices attempt to transmit, thereby reducing the probability of collision. In other words, each time a device wishes to transmit data frames, it may wait for a random period. If the channel is found to be idle or free, following the random backoff, the device may transmit its data. If the channel is found to be busy, following the random backoff, the device may wait for another random period before trying to access the channel again.

In various embodiments, different CSMA techniques may be employed. For instance, physical carrier sense (PCS) may be provided by a physical layer (PHY) upon detection of a preamble. In contrast, a virtual carrier sense (VCS) mechanism may be provided by a media access control (MAC) layer by tracking the expected duration of channel occupancy. Virtual carrier sense may be set, for example, by the length of received packet (or upon collision). In these cases, VCS tracks or estimates the expected duration of the "busy" state of the medium (i.e., when a given PLC device is transmitting data over power lines or wires 103, 105, and/or 108).

FIG. 5 shows a flowchart of a prior art CSMA method that may be applicable, for instance, to a non-beacon personal area network (PAN) as described in the IEEE 802.15.4 standard. Using this method, a random backoff mechanism spreads the time over which stations attempt to transmit (thereby reducing the probability of collision). This CSMA algorithm is typically used before the transmission of data or MAC command frames, and it is implemented using units of time called "backoff periods," where one backoff period is equal to unitBackoffPeriod symbols.

As illustrated in block 501, each device may maintain two variables for each transmission attempt: NB and BE. Specifically, NB is the number of times the CSMA algorithm was required to backoff while attempting the current transmission, which may be initialized to "0" before each new transmission attempt. On the other hand, BE is the backoff exponent, which is related to how many backoff periods a device shall wait before attempting to assess a channel and which may be initialized to the value of minBE. The method may initialize NB and BE and then proceed to block 502. At block 502, the method may create a delay, for a random number of complete backoff periods (e.g., in the range 0 to $2^{BE}-1$), and then request that a PCS operation be performed in block 503. The backoff time may then be given by Backoff Time=Random($2^{BE}-1$)×aSlotTime; where aSlotTime is equal to the duration of a contention window slot (e.g., by number of symbols).

At block 504, if the channel is assessed to be busy, the method may increment both NB and BE by one in block 506, while ensuring that BE does not exceed maxBE (for high priority packets, maxBE may be equal to minBE). At block 507, if the value of NB is less than or equal to maxCSMABackoffs, the method may return to block 502. If the value of NB is greater than maxCSMABackoffs, the method shall terminate, for example, with a channel access failure status or indication. Returning to block 504, if the channel is assessed to be idle, the method may immediately begin transmission of the frame at block 505.

As the inventors hereof have recognized with respect to the method described in FIG. 5, however, PCS is sensed prematurely. Each PCS interval is calculated independently of a VCS sensing result. If one node is sending a large packet, the competing node may fail easily due to unnecessary PCS trials. Additionally or alternatively, contention window increases prematurely. Every time PCS is busy, the BE is increased. Thus, if a node fails the first time of PCS, it then has a higher chance than the others to fail the following PCS due to its increased window, creating unfairness problems.

To address these and other issues, embodiments discussed herein provide techniques for using one or more VCS operations to save one or more unnecessary PCS operations. Also, in some implementations, the contention window may be increased when an ACK message or package is lost, thus differentiating a collision event from detection of a busy medium. In various embodiments, the techniques discussed herein may be applied in PLC mesh networks with random medium access, although other types of networks may also be used. Furthermore, these embodiments may be used with various PLC standards, such as, for example, the G3-PLC standard or the like.

Turning now to FIG. 6, a flowchart of a CSMA method is depicted according to some embodiments. In various embodiments, the method of FIG. 6 may be performed, for example, by PLC device 103, PLC gateway 112, and/or PLC data concentrator 114. At block 601, the method may include setting one or more backoff parameters (e.g., an NB counter and/or BE) to their initial values. At block 602, the method may perform a VCS operation, for example, until the VCS operation determines that a communication channel is idle or free. Then, at blocks 602 and 603, the method may create a delay and request that a PCS operation be performed similarly as in blocks 501 and 502 of FIG. 5. In contrast with the method of FIG. 5, however, in this case PCS is tried when VCS (virtual carrier sensing) is not busy. That is, VCS is consulted before PCS. When VCS becomes idle from a busy state, all the nodes (i.e., PLC devices) may be aligned at the same time for a fair competition for the channel. As such, both VCS and PCS may be used, and VCS saves the unnecessary PCS so that CSMA does not fail, for example, due to large packet transmission.

At block 605, the method may determine whether the channel is idle or free based on the PCS operation. If so, the method may send data over the channel at block 606. At block 607, the method may determine whether the data transmission is a broadcast or a unicast transmission (the latter involves receiving an acknowledgement message in response to a successful transmission, whereas the former does not). If the data transmission is a unicast transmission, the method may determine whether an acknowledgement has been received at block 608. If the data transmission is a broadcast transmission or if an acknowledgement has been received for a unicast transmission, the method may end with a success indication. Otherwise, at block 609, both NB and BE may be incremented.

Returning to block 605, if the channel is busy, only NB may be incremented (but not the size of the contention window). Then, at block 611, if the maximum number of backoffs has been reached, the method may end with a failure indication. Otherwise the method may return to block 602. As such, BE may be increased if an acknowledgment (ACK) message or packet is not received (in the case of a unicast transmission). When PCS returns idle, a data frame may be sent out. Otherwise, the method may wait for the VCS to finish and BE remains the same value. When data is sent out without an ACK message being received, BE is increased. After a busy indication from the PCS operation, however, the node or device may not increase its contention window so that all the nodes can have a fair CSMA competition. That is, only after an ACK is lost, thus suggesting a possible packet collision and crowded medium, may the node increase the contention window to compete with other devices for use of the channel.

It should be noted that, when an ACK is lost, potentially there are two most likely reasons. First, channel condition may be bad, in which case the sender may try to transmit again without increasing the contention window size. Second, there may have occurred a packet collision (due to the channel being busy), in which case competing senders may increase their time or contention window size before trying to transmit again. In some implementations, a sender and a receiver may interact with each other regarding the (past) lost ACK using extra bits in NACK (if NACK is able to be sent) or some additional exchange of information. The receiver may use the information to help the sender(s) differentiate the bad channel condition from the packet collision, so that the sender may respond differently when an ACK is lost. Additionally or alternatively, a receiver may also warn a sender about the bad channel using extra bits in the ACK packet if the receiver found the received packet has a low link quality indicator (LQI).

FIG. 7 is a block diagram of an integrated circuit according to some embodiments. In some cases, one or more of the devices and/or apparatuses shown in FIGS. 2-4 may be implemented as shown in FIG. 7. In some embodiments, integrated circuit 702 may be a digital signal processor (DSP), an application specific integrated circuit (ASIC), a system-on-chip (SoC) circuit, a field-programmable gate array (FPGA), a microprocessor, a microcontroller, or the like. Integrated circuit 702 is coupled to one or more peripherals 704 and external memory 703. In some cases, external memory 703 may be used to store and/or maintain databases 304 and/or 404 shown in FIGS. 3 and 4. Further, integrated circuit 702 may include a driver for communicating signals to external memory 703 and another driver for communicating signals to peripherals 704. Power supply 701 is also provided which supplies the supply voltages to integrated circuit 702 as well as one or more supply voltages to memory 703 and/or peripherals 704. In some embodiments, more than one instance of integrated circuit 702 may be included (and more than one external memory 703 may be included as well).

Peripherals 704 may include any desired circuitry, depending on the type of PLC system. For example, in an embodiment, peripherals 704 may implement local communication interface 303 and include devices for various types of wireless communication, such as WI-FI, ZIGBEE, BLUETOOTH, cellular, global positioning system, etc. Peripherals 704 may also include additional storage, including RAM storage, solid-state storage, or disk storage. In some cases, peripherals 704 may include user interface devices such as a display screen, including touch display screens or multi-touch display screens, keyboard or other input devices, microphones, speakers, etc.

External memory 703 may include any type of memory. For example, external memory 703 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 703 may include one or more memory modules to which the memory devices are mounted, such as single inline memory modules (SIMMs), dual inline memory modules (DIMMs), etc.

It will be understood that various operations illustrated in FIG. 6 may be executed simultaneously and/or sequentially. It will be further understood that each operation may be performed in any order and may be performed once or repetitiously. In various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
periodically determining, by a communication device, whether a communication channel is idle or busy;
determining a first backoff time for a first transmission attempt based on a second backoff time for a second transmission attempt by adjusting, by the communication device, the second backoff time based on detecting a first collision event involving the second transmission attempt while the communication channel is determined idle;
determining a third backoff time for a third transmission attempt based on a fourth backoff time for a fourth transmission attempt by refraining, by the communication device, from adjusting the fourth backoff time based on a determination that the communication channel is busy during the fourth transmission attempt;
determining a fifth backoff time for a fifth transmission attempt based on a sixth backoff time for a sixth transmission attempt by refraining, by the communication device, from adjusting the sixth backoff time based on absence of a second collision event involving the sixth transmission attempt; and
suspending, by the communication device, each of the first, second, third, fourth, fifth, and sixth transmission attempts during a respective one of the first, second, third, fourth, fifth, and sixth backoff times.

2. The method of claim 1, wherein the periodically determining whether the communication channel is idle or busy includes:
performing, by a media access control (MAC) layer of the communication device, a virtual carrier sense (VCS) operation to determine an expected occupancy of the communication channel.

3. The method of claim 2, wherein the periodically determining whether the communication channel is idle or busy includes:
performing, by a physical layer of the communication device, a physical carrier sense (PCS) operation after the expected occupancy expires to determine whether the communication channel is idle or busy.

4. The method of claim 3, wherein the suspending of the first transmission attempt includes suspending access to the communication channel during the first backoff time after the VCS operation and before the PCS operation.

5. The method of claim 1, wherein the detecting of the first collision event includes:
transmitting, by the communication device, a unicast package to the communication channel; and
detecting, by the communication device, the first collision event when an acknowledge message is not received from the communication channel within a predetermined time period after the unicast package is transmitted.

6. The method of claim 1, wherein the adjusting of the second backoff time includes increasing a backoff exponent related to a contention window.

7. The method of claim 1, wherein the refraining from adjusting the fourth backoff time includes maintaining unchanged a backoff exponent related to a contention window.

8. The method of claim 1, further comprising:
incrementing, by the communication device, a backoff counter upon determining the communication channel is busy or detecting the first collision event;
repeating, by the communication device, a transmission attempt when the backoff counter is less than or equal to a predetermined threshold; and
terminating, by the communication device, the transmission attempt when the backoff counter exceeds the predetermined threshold.

9. The method of claim 1, wherein:
the communication channel includes a frequency band conducted by a power line; and
the communication device includes a power line communication (PLC) device coupled with a data concentrator via the communication channel.

10. A power line communication (PLC) device comprising:
a gateway engine configured to access a communication network via a communication channel conducted by a power line; and
a memory coupled to the gateway engine and storing instructions that, upon implemented by the gateway engine, cause the gateway engine to:
periodically determine whether the communication channel is idle or busy;
determine a first backoff time for a first transmission attempt based on a second backoff time for a second transmission attempt by:
adjusting the second backoff time based on detecting a first collision event while the communication channel is determined idle;
refraining from adjusting the second backoff time based on the communication channel being determined busy; and
refraining from adjusting the second backoff time based on absence of a second collision event; and
suspend the first transmission attempt during the first backoff time.

11. The PLC device of claim 10, wherein:
the gateway engine includes a media access control (MAC) layer configured to periodically determine whether the communication channel is idle or busy by performing a virtual carrier sense (VCS) operation to determine an expected occupancy of the communication channel.

12. The PLC device of claim 11, wherein:
the gateway engine includes a physical layer configured to periodically determine whether the communication channel is idle or busy by performing a physical carrier sense (PCS) operation after the expected occupancy expires to determine whether the communication channel is idle or busy.

13. The PLC device of claim 12, wherein the gateway engine is configured to suspend the first transmission attempt by suspending access to the communication channel during the first backoff time after the VCS operation and before the PCS operation.

14. The PLC device of claim 10, wherein the gateway engine is configured to detect the first collision event by:
transmitting a unicast package to the communication channel; and
detecting the first collision event based on an acknowledge message not being received from the communication channel within a predetermined time period after the unicast package is transmitted.

15. The PLC device of claim 10, wherein the gateway engine is configured to adjust the second backoff time by increasing a backoff exponent related to a contention window.

16. The PLC device of claim 10, wherein the gateway engine is configured to refrain from adjusting the second backoff time by maintaining unchanged a backoff exponent related to a contention window.

17. The PLC device of claim 10, wherein the gateway engine is configured to:
increment a backoff counter based on determining the communication channel is busy or detecting the first collision event;
perform the first transmission attempt based on the backoff counter being less than or equal to a predetermined threshold; and
terminate the first transmission attempt based on the backoff counter exceeding the predetermined threshold.

18. The PLC device of claim 10, further comprising:
a database coupled with the gateway engine, the database configured to store frequency data related to the communication channel;
wherein the gateway engine is configured to manage the communication channel based on the stored frequency data.

19. A nontransitory computer readable medium storing instructions that, upon implemented by a gateway engine of a power line communication (PLC) device, cause the gateway engine to perform a method comprising:
periodically determining whether a communication channel is idle or busy;
determining a first backoff time for a first transmission attempt based on a second backoff time for a second transmission attempt that is prior to the first transmission attempt by:
adjusting the second backoff time based on detecting a first collision event while the communication channel is determined idle;
refraining from adjusting the second backoff time based on a determination that the communication channel is busy; and
refraining from adjusting the second backoff time based on receiving an acknowledgment that indicates absence of a second collision event; and
suspending the first transmission attempt during the first backoff time.

20. The nontransitory computer readable medium of claim 19, wherein periodically determining whether the communication channel is idle or busy includes:
directing a media access control (MAC) layer of the gateway engine to perform a virtual carrier sense (VCS) operation to determine an expected occupancy of the communication channel.

* * * * *